No. 874,141.  
PATENTED DEC. 17, 1907.  
I. A. WEAVER.  
HARROW TRANSPORTER.  
APPLICATION FILED JUNE 17, 1907.

Witnesses:  
Inventor:  
Ira A. Weaver  
By Offield, Towle & Linthicum  
Atty's

UNITED STATES PATENT OFFICE.

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

HARROW-TRANSPORTER.

No. 874,141.  Specification of Letters Patent.  Patented Dec. 17, 1907.

Application filed June 17, 1907. Serial No. 379,402.

*To all whom it may concern:*

Be it known that I, IRA A. WEAVER, a citizen of the United States, residing at Springfield, in the county of Sangamon and State of Illinois, have invented certain new and useful Improvements in Harrow-Transporters, of which the following is a specification.

My invention concerns harrow transporters or shoes, and relates particularly to such devices for use in connection with disk harrows. The shoes are intended to raise the cutting disks above the ground and afford runners on which the harrow may be slid over the ground when not in use, thereby avoiding injury to the disks and preventing the cutting up and damage to roadways and other ground. Each transporter or shoe has a flat runner with an upwardly curved toe to which is attached a chain or similar device adapted to be fastened to any suitable part of the harrow frame to hold the runner or flat bar in normal sliding transporting position. Arising or upstanding from the runner is a pair of supporting standards intended to receive between them one of the disks and support the harrow at their top ends by engagement with the spacing spools on opposite sides of the disk. The standards comprise crossed bars, the upper forked ends of which receive and support the spools. Two of such shoes or transporters are used for the harrow and each is fastened by a proper length of chain to the front bar of the harrow frame. To load the harrow on the transporter, each runner is placed in front of the harrow with its heel on the ground and its forked standards in engagement with the spools on opposite sides of one of the disks. Forward travel and movement of the horses and harrow raises the latter into position on the standards of the pair of shoes or transporters, the runners turning about their heels assuming proper transporting position and being retained therein by the chains. To land the harrow on the ground again, that is dismount it from the transporter shoes, or runners, it is merely necessary for the team of horses to step backwardly and thereby move the harrow rearwardly, whereupon the shoes tip up or rock on their heels and discharge the harrow on the ground. The shoes or transporters are then detached and replaced again when it is desired to convey or transport the harrow over ground not to be cut up, or over walks, railroad tracks, or the like, which would be likely to damage or injure the disks.

Figure 1:
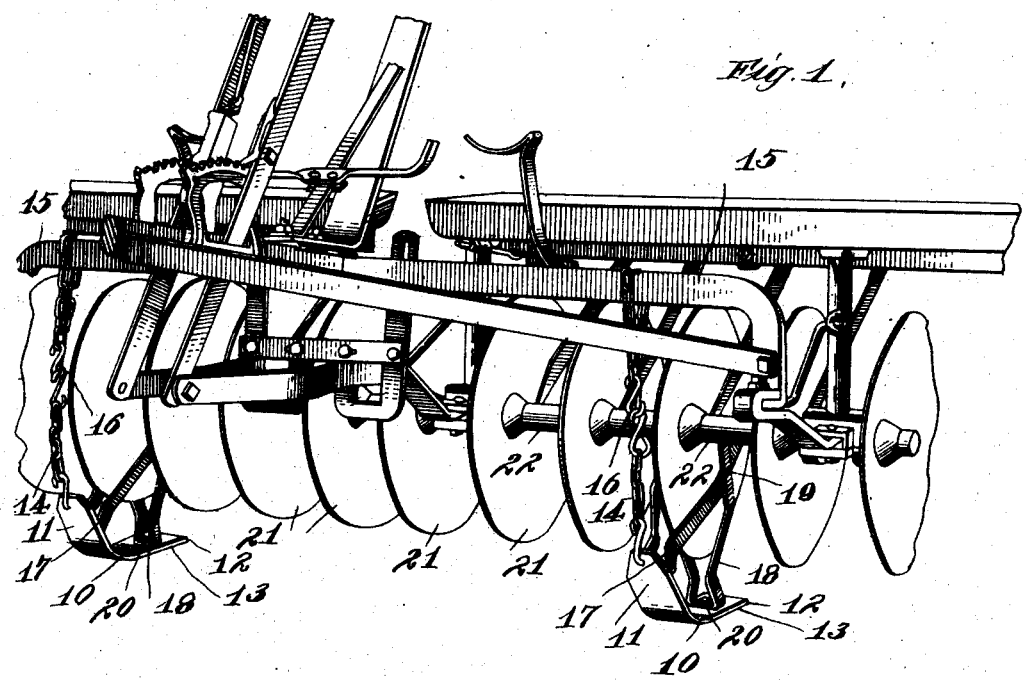
Figure 2:
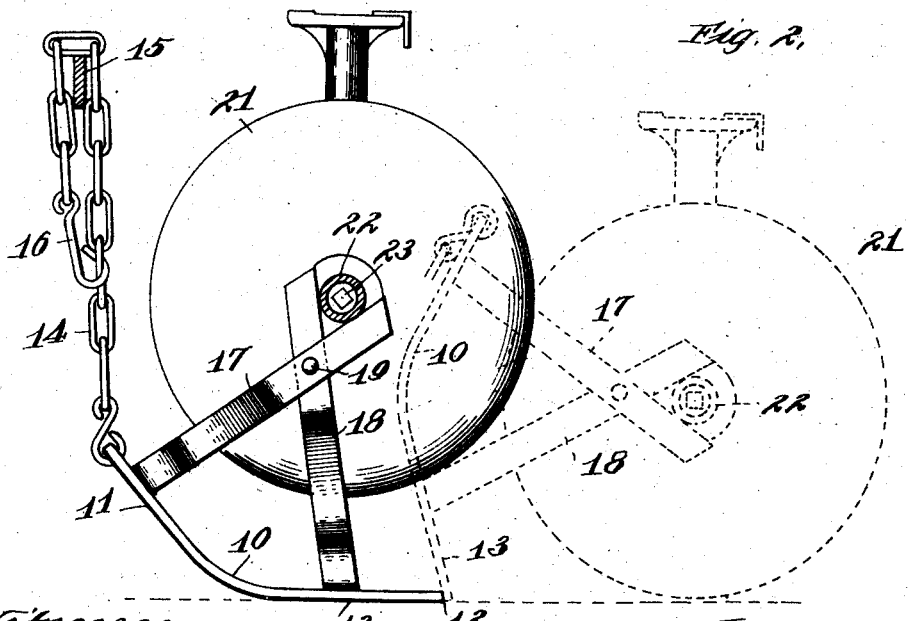

I have illustrated the essential features of my disk harrow transporter on the accompanying drawings, forming a part of this specification, wherein Figure 1 is a perspective view of a portion of a disk harrow showing the same loaded or mounted on a pair of my improved transporting shoes; and Fig. 2 is a side elevation of one of the transporting shoes and illustrates also a portion of the harrow, and in dotted lines shows the manner of loading the harrow on the shoes and discharging the same on the ground again.

Each transporter or shoe has a runner 10 formed of a flat bar, the forward or toe end 11 of which is curved upwardly in order to facilitate its riding over obstacles in its path of travel. The rear lower transverse corner 12 at the heel of the shoe is as shown in substantially the same plane as the flat portion 13 of the runner which slides upon the ground in operation. In order to maintain the runner in proper position during the transporting operation, there is fastened to its toe 11 a chain 14 which is passed or looped around the front bar 15 of the harrow, its terminal hook 16 being passed through one of the links, as is clearly shown in both figures. Mounted on the top surface of each runner 10 is a pair of parallel supporting standards formed by two substantially U-shaped bars 17 and 18, the legs of which are crossed near their upper ends and riveted together at 19. The portion of the U-shaped bar 17 connecting its legs is riveted to the upturned toe 11 of the runner, while the corresponding part of the bar 18 is riveted to the flat portion of the runner at 20. As is usual, the harrow has a plurality of disks 21 and a number of separating spools or sleeves 22 between the disks mounted on a shaft or rod 23 passing centrally through the disks.

In order to load the harrow on to a pair of my improved transporters or shoes, the chains of the latter are attached or looped over the bar 15 of the harrow frame, or any other suitable part of the frame, and each shoe is placed in front of one of the disks 21 with its heel and sharp edge 12 resting on the ground, while the forked standards straddle the disk and receive in their forked ends spools or sleeves on opposite sides of the disk, as is clearly illustrated in dotted lines in Fig. 2. When the team of horses and harrow are started forwardly, the transporters or shoes turn about their heels and the sharp edges 12 into the full line position shown in Fig. 2, the harrow traveling with the shoes and being supported by the standards with its disks above the ground when the shoes are in the operative position shown in full lines in both figures. The unloading of the harrow is accomplished as easily as its loading on the transporters, the shoes tipping backwardly about their heels when the team and harrow are moved rearwardly, the harrow being dumped or discharged on the ground, as will be obvious. The discharging operation, as will be observed, is substantially the reverse of the loading described above.

To those skilled in the art it will be apparent that the structural details of my device may be varied within wide limits without departure from the heart and substance of my invention.

I claim:

1. A disk harrow transporter comprising a runner adapted to slide on the ground, and a supporting standard upstanding from said runner and having an open-top socket adapted to receive a portion of the harrow at one side of a disk, substantially as described.

2. A disk harrow transporter comprising a runner adapted to slide on the ground, a supporting standard upstanding from said runner and having an open-top socket adapted to receive a portion of the harrow, and means to attach the toe or forward end of said runner to the harrow frame, substantially as described.

3. A disk harrow transporter comprising a runner adapted to slide on the ground, and a supporting standard on the top of said runner comprising crossed bars adapted to receive a portion of the harrow in its upper forked end, substantially as described.

4. A disk harrow transporter comprising a runner adapted to slide on the ground, a supporting standard on the top of said runner comprising crossed bars adapted to receive a portion of the harrow in its upper forked end, and means to fasten the toe or forward end of said runner to the harrow frame, substantially as described.

5. A disk harrow transporter comprising a runner having a flat portion adapted to slide on the ground and an upwardly turned toe, and a supporting standard upstanding from said runner and having an open-top socket adapted to receive a portion of the harrow at one side of a disk, substantially as described.

6. A disk harrow transporter comprising a runner adapted to slide on the ground, said runner having an upwardly-curved toe, a supporting standard on the top of said runner comprising crossed bars adapted to receive a portion of the harrow in its upper forked end, and a chain fastened to the toe of said runner and adapted to be fastened to the frame of the harrow, substantially as described.

7. A disk harrow transporter comprising a runner adapted to slide on the ground, and a pair of supporting standards on said runner adapted to receive a disk of the harrow between them, said standards being formed of two substantially U-shaped bars fastened to said runner, having their legs crossed, and intended to receive a portion of the harrow in their upper forked ends, substantially as described.

8. A disk harrow transporter comprising a runner adapted to slide on the ground, a pair of supporting standards on said runner adapted to receive a disk of the harrow between them, said standards being formed of two substantially U-shaped bars fastened to said runner, having their legs crossed, and intended to receive a portion of the harrow in their upper forked ends, and means to connect the toe of said runner to the harrow frame, substantially as described.

9. A disk harrow transporter comprising a runner adapted to slide on the ground and having an upwardly curved toe, a pair of supporting standards on said runner adapted to receive a disk of the harrow between them, said standards being formed of two substantially U-shaped bars, having their legs crossed, and intended to receive a portion of the harrow in their upper forked ends, one of said U-shaped bars being secured to the toe of said runner, the other U-shaped bar being fastened to the base of the runner, and means to connect the toe of said runner with the frame of the harrow, substantially as described.

10. A disk harrow transporter comprising a runner adapted to slide on the ground, and having a transverse rear edge at its heel in substantially the plane of the bottom surface of the runner to prevent slipping of the runner during loading and unloading of the harrow, and one or more supporting standards on said runner each having an open-top socket adapted to receive a portion of the harrow, substantially as described.

11. A disk harrow transporter comprising a runner adapted to slide on the ground, and having a transverse rear edge at its heel in substantially the plane of the bottom surface of the runner to prevent slipping of the runner during loading and unloading of the harrow, one or more supporting standards on said runner each having an open-top socket adapted to receive a portion of the harrow, and means to connect the toe or forward portion of the runner to the frame of the harrow, substantially as described.

IRA A. WEAVER.

Witnesses:
  M. A. McCutchen,
  B. J. Detrick.